United States Patent
Deng et al.

(10) Patent No.: US 6,362,988 B1
(45) Date of Patent: Mar. 26, 2002

(54) SYSTEM AND METHOD FOR SYNCHRONIZING THE PHASE ANGLE FOR AN AC POWER SOURCE IN PARALLEL OPERATION WITH A GRID

(75) Inventors: Doug D. Deng; Mukunda V. Prema, both of Canton, MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/606,865

(22) Filed: Jun. 29, 2000

(51) Int. Cl.[7] .............................................. H02M 5/00
(52) U.S. Cl. ........................................................ 363/148
(58) Field of Search ................................. 363/148, 149, 363/156; 323/265, 266, 271; 327/141, 155, 156, 162, 163

(56) References Cited

U.S. PATENT DOCUMENTS

| | | | | |
|---|---|---|---|---|
| 5,369,564 A | * | 11/1994 | Choi | 363/71 |
| 5,828,253 A | * | 10/1998 | Murayama | 327/156 |
| 5,856,761 A | * | 1/1999 | Jokura | 331/11 |
| 6,239,997 B1 | * | 5/2001 | Deng | 363/95 |

* cited by examiner

*Primary Examiner*—Matthew Nguyen
(74) *Attorney, Agent, or Firm*—Ford Global Technologies, Inc.

(57) ABSTRACT

A system 10 for synchronizing the phase angle of an alternating current power source ("APS") 12 with the phase angle of a power grid 14. The system 10 provides for reliable synchronization between the phase angle of the APS 12 and the phase angle of the power grid 14 during both normal and abnormal operating conditions.

18 Claims, 3 Drawing Sheets

SYSTEM AND METHOD FOR SYNCHRONIZING THE PHASE ANGLE FOR AN AC POWER SOURCE IN PARALLEL OPERATION WITH A GRID

FIELD OF THE INVENTION

This invention relates to a system and a method for synchronizing the phase angle for an alternating current ("AC") power source which operates in parallel with a power grid, and more particularly, to a system and a method which provides reliable synchronization of the phase angle for an AC power source operating in parallel with a grid in both normal and abnormal operating conditions.

BACKGROUND OF THE INVENTION

Alternating current power sources ("APS"), such as static power converters ("SPC"), are commonly used to provide electrical energy and power to electrical devices, networks or grids. One type of APS, commonly referred to as a three-phase AC power source, provides voltage in three separate phases. A requirement for this type of three-phase power delivery arrangement is that the voltage phase angle of the APS is synchronized with the voltage phase angle of the grid.

The phase synchronization of an APS and its associated grid is typically controlled through the use of one or more "phase lock loops" ("PLL"). While the PLL technique can maintain synchronization between the APS and grid during many operating conditions, it suffers from several drawbacks.

For example and without limitation, in abnormal operating conditions, if grid voltage is lost for a short duration of time (e.g., for 0.1 seconds, as a result of switch "bounce"), the PLL will not function properly, as it will not receive critical inputs from the grid. Under such fault conditions, the PLL will lose synchronization with the grid and abnormal current may undesirably occur (e.g., over current, distortion current and other forms of disruptive current). Furthermore, even very small errors in synchronization, if not properly corrected or compensated, will accumulate over time causing the creation of relatively large undesirable errors. Such errors and corresponding abnormal currents often prevent reliable parallel operation between the APS and grid and may damage devices or components within the system.

There is therefore a need for a system and a method for providing relatively precise synchronization between an APS and a power grid, and which is effective to reliably generate the synchronized phase angle for the APS to connect to the grid during both normal and abnormal operating conditions.

SUMMARY OF THE INVENTION

It is a first object of the invention to provide a system and a method for synchronizing the phase angle for an alternating current power source ("APS") operating in parallel with a power grid which overcomes some or all of the previously delineated drawbacks associated with prior systems and methods.

It is a second object of the invention to provide a system and a method for synchronizing the phase angle for an APS operating in parallel with a power grid, which provides reliable synchronization during both normal and abnormal operating conditions.

It is a third object of the invention to provide a system and a method for precisely synchronizing the phase angle for a three-phase APS operating in parallel with a power grid.

According to a first aspect of the present invention, a system is provided for synchronizing a first phase angle of a power source with a second phase angle of a power grid. The system includes a first portion which receives a grid voltage and which uses the grid voltage to calculate the second phase angle; a second portion which is communicatively connected to the first portion, which receives the second phase angle, and which uses the second phase angle to calculate a grid voltage frequency; a third portion which is communicatively connected to the second portion, which receives the grid voltage frequency, and which uses the grid voltage frequency to generate an increment angle; a fourth portion which is communicatively connected to the first portion, which receives the second phase angle, and which generates an initial angle based upon the second phase angle; and a fifth portion which is communicatively connected to the third and fourth portions, which selectively receives the increment angle and the initial angle, and which uses the received increment and initial angles to generate the first phase angle having a value that is substantially identical to the second phase angle.

According to a second aspect of the present invention, a method is provided for synchronizing a first phase angle of a power source with a second phase angle of a power grid. The method includes the steps of receiving a grid voltage from the power grid; calculating the, second phase angle by use of the grid voltage; calculating a grid voltage frequency by use of the second phase angle; generating an increment angle by use of the grid voltage frequency; generating an initial angle based upon the second phase angle; and using the increment and initial angles to generate the first phase angle having a value that is substantially identical to the second phase angle.

These and other features, advantages, and objects of the invention will become apparent by reference to the following specification and by reference to the following drawings.

DETAILED DESCRIPTION OF THE PREFERRED EMBODIMENT OF THE INVENTION

Figure 1:
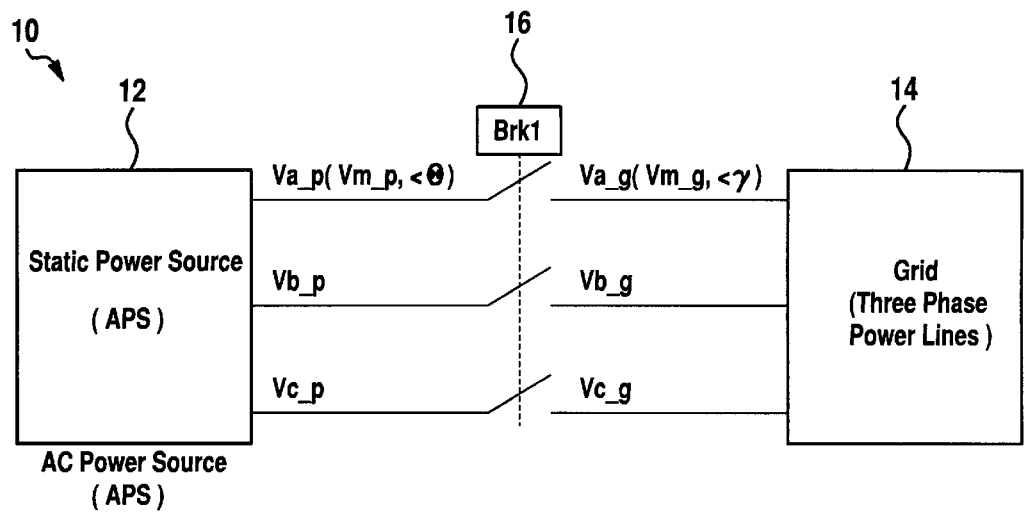
FIG. 1 is a block diagram illustrating a three phase alternating current power source ("APS") operating in parallel with a three-phase power grid in accordance with the teachings of the preferred embodiment of the invention.

Referring now to FIG. 1, there is shown an electrical system 10 including an alternating current power source ("APS") 12 which is selectively and operatively coupled to and operates in parallel with a power grid 14. In the preferred embodiment, APS 12 and grid 14 are selectively coupled together by way of a conventional circuit breaker 16 (e.g., Brk1). The system 10 utilizes a control system or strategy for synchronizing the phase angle of the APS 12 ("θ") with the phase angle of the power grid 14 ("γ") in accordance with the teaching of the preferred embodiment of the invention. While in the preferred embodiment APS 12 and grid 14 provide and/or utilize a conventional three-phase alternating current, it should be appreciated that the present invention may be utilized with other types of multi-phase alternating currents.

As shown in FIG. 1, APS 12 is operating in parallel with grid 14. For purposes of this discussion, $V_{m\_g}\cdot\text{Sin}(\gamma)$ represents the phase "A" voltage (Va_g) of the grid 14; $V_{m\_g}\cdot\text{Sin}(\gamma+120°)$ represents the phase "B" voltage (Vb_g) of the grid 14; and $V_{m\_g}\cdot\text{Sin}(\gamma+240°)$ represents the phase "C" voltage (Vc_g) of the grid 14. Furthermore, $V_{m\_p}\cdot\text{Sin}(\theta)$ represents the phase "A" voltage (Va_p) of the APS 12; $V_{m\_p}\cdot\text{Sin}(\theta+120°)$ represents the phase "B" voltage (Vb_p) of the APS 12; and $V_{m\_p}\cdot\text{Sin}(\theta+240°)$ represents the phase "C" voltage (Vc_p) of the APS 12.

As should be appreciated by one of ordinary skill in the art, when the APS 12 operates in parallel with the grid 14, the voltage magnitude $V_{m\_p}$ of the APS 12 should be equal to the voltage magnitude $V_{m\_g}$ of the grid 14. Furthermore, the phase angle θ of the APS 12 should be equal to the phase angle γ of the grid 14. In FIG. 1, circuit breaker 16 can be "closed" when $V_{m\_p}=V_{m\_g}$ and θ=γ, and the two conditions should be kept whenever breaker 16 is closed.

Phase angle synchronization between the APS 12 and the grid 14 is achieved when θ is made exactly equal to γ. As discussed more fully and completely below, the present invention substantially and reliably ensures that phase angles θ and γ remain substantially equal in value, and therefore reliably provides synchronization between the APS 12 and the grid 14.

In the preferred embodiment, system 10 includes one or more microprocessors, controllers and/or integrated circuits which cooperatively perform the below-described calculations, algorithms, and/or control strategies. In the preferred embodiment, these microprocessors or controllers are at least partially contained within and/or are communicatively coupled to the APS 12 and/or the grid 14 and are effective to control and/or generate the phase angle θ, and to ensure that angle θ is substantially identical to phase angle γ. In the preferred embodiment, the grid frequency change rate is relatively low, and in one non-limiting embodiment, is less than 0.1 Hz per second. In the present invention, the microprocessor controller updates the phase angle θ once in every time step $t_{upd}$. The time step $t_{upd}$ is much smaller than the cycle time (20,000/16,666 μs) corresponding to a 50/60 Hz voltage. In the preferred embodiment, $t_{upd}$ is 50–200 μs.

Figure 2:
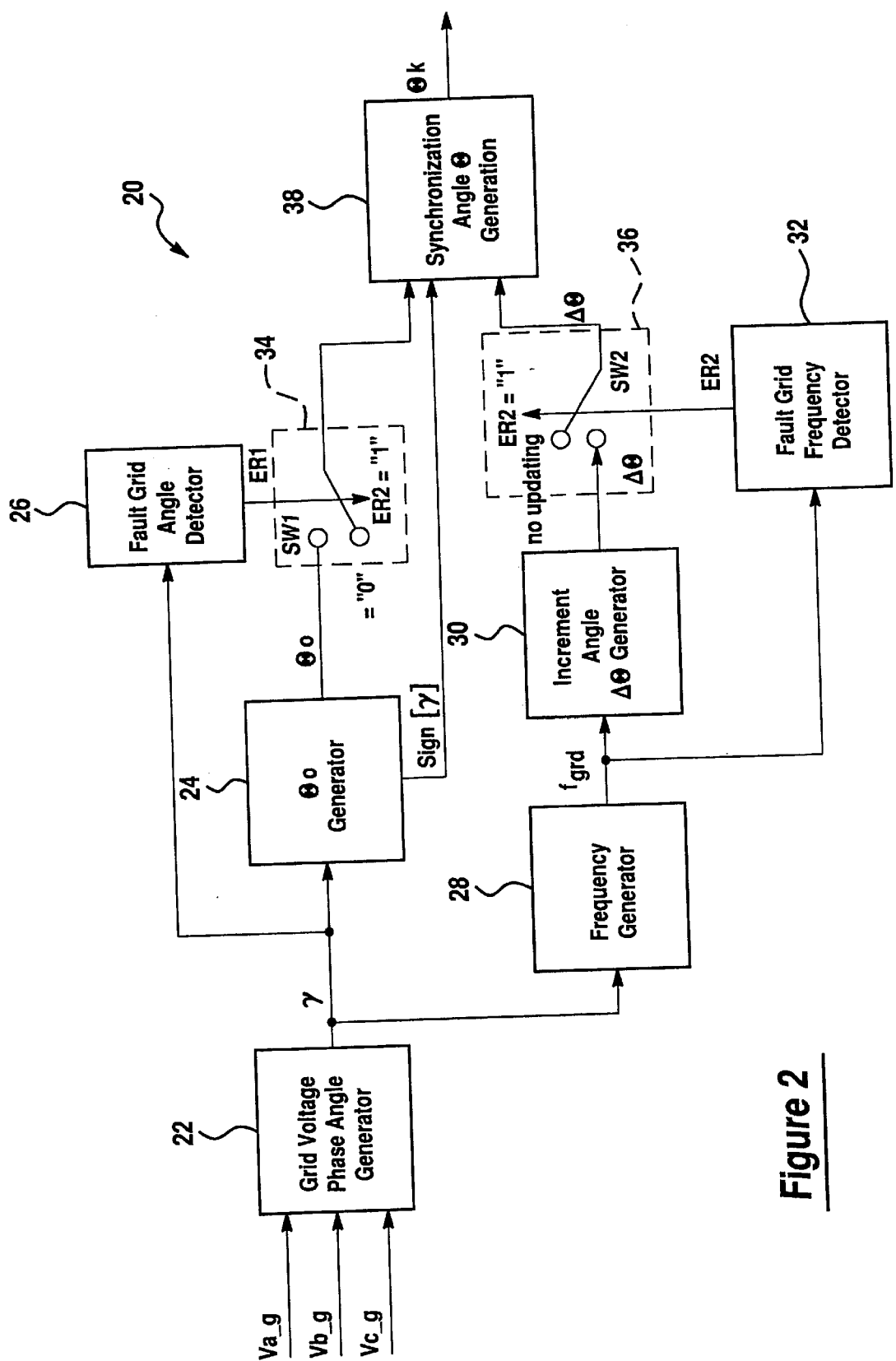
FIG. 2 is a block diagram of a control system or strategy for synchronizing the voltage phase angle of the APS shown in FIG. 1 with the power grid shown in FIG. 1.

Referring now to FIG. 2, there is shown one non-limiting embodiment of the control system, method or strategy 20 which is utilized and/or executed by system 10 (i.e., by one or more microprocessors and/or controllers resident within system 10) to synchronize phase angles θ and γ. Control strategy 20 begins at functional block, portion or step 22, where the grid voltages Va_g, Vb_g, and Vc_g are monitored or measured and entered or inputted into a grid voltage phase angle generator 22. As shown, block 22 has three inputs Va_g, Vb_g, Vc_g, which are the three phase voltages of the grid 14, and one output which represents the voltage phase angle γ of the grid 14. Block 22 utilizes the basic theory of an AC electrical machine to calculate the voltage phase angle γ. Particularly, the voltage phase angle of a three-phase AC voltage system is calculated by the following equations:

$$V_{\alpha\_grd\_k}=V_{a\_g\_k} \quad (\text{Eq. 1})$$

$$V_{\beta\_grd\_k}=2/\sqrt{3}(V_{b\_g\_k}-V_{c\_g\_k}) \quad (\text{Eq. 2})$$

$$\gamma_k=\arctan 2\ (V_{\beta\_grd\_k}/V_{\alpha\_grd\_k}) \quad (\text{Eq. 3})$$

where $-\pi\leq\gamma_k\leq\pi$

In the above equations (i.e., Eq. 1–3), Va_g_k, Vb_g_k, and Vc_g_k are the sampled three-phase grid voltages of Va_g, Vb_g, Vc_g at the time step "k"; $V_{\alpha\_grd\_k}$ and $V_{\beta\_grd\_k}$ are the converted two-phase voltages at time step "k" that are used to obtain the grid phase angle $\gamma_k$ in the algorithm; and $\gamma_k$ is the grid voltage phase angle at time step "k". As should be appreciated by one of ordinary skill in the art, angle $\gamma_k$ has a value within -π to +π in the algorithm, and the angle $\gamma_k$ has a repeat frequency equal to the frequency of the grid voltage.

Figure 3:
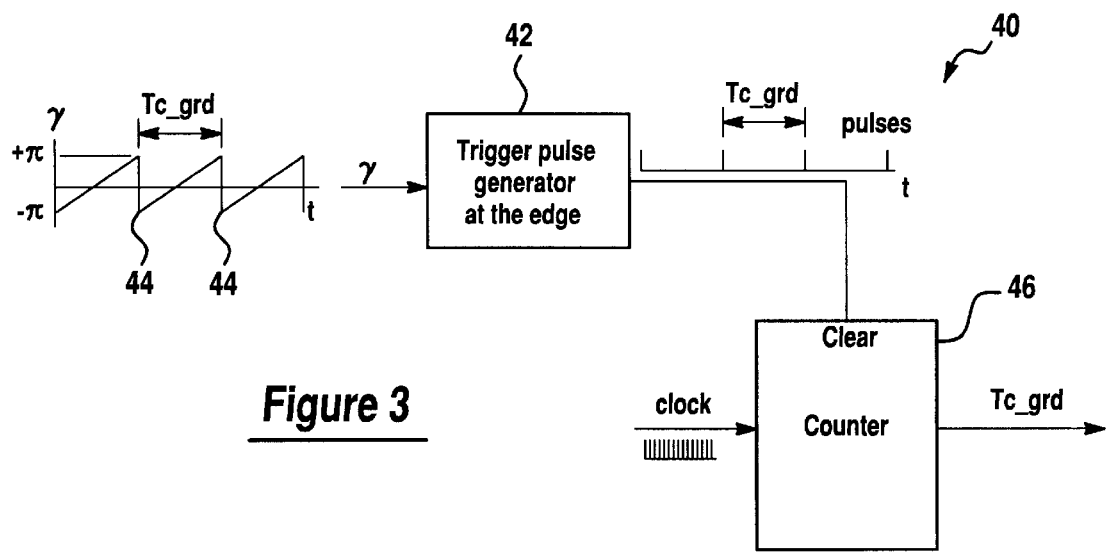
FIG. 3 is a block diagram illustrating the function of a time counter used within the system shown in FIG. 2.

The calculated grid voltage phase angle $\gamma_k$ is then communicated to functional blocks, portions or steps 24, 26 and 28. Functional block, portion or step 28 represents and/or comprises a frequency calculator that is used to detect the frequency of the grid voltage $f_{grd}$. Block or portion 28 includes a time counter that counts the elapsed time for a cycle (-π to +π) of the grid voltage $T_{c\_grd}$. One non-limiting embodiment of a time counter 40 that may be used in block 28 is illustrated in FIG. 3. As shown, counter 40 includes a trigger pulse generator 42 which receives the grid phase angle signal γ. Pulse generator 42 senses or detects the edges 44 of each cycle of the phase angle signal γ and emits a pulse in response thereto. These pulses are communicated to a counter 46 which further receives a clock signal and which utilizes the clock signal to determine the time between each pulse (i.e., the cycle time $T_{c\_grd}$). When the cycle time $T_{c\_grd}$ of the grid voltage is obtained, the frequency of the grid voltage is calculated by following equation in functional block 28:

$$f_{grd}=1/T_{c\_grd} \quad (\text{Eq. 4})$$

The frequency of the grid voltage is communicated to functional blocks 30 and 32. Functional block, portion or step 30 is communicatively connected to portion 28 and is effective to generate an increment angle Δθ that is used as an input for the synchronization angle generating block or step 38. In block or portion 30, angle Δθ is generated by use of the following equation:

$$\Delta\theta=2\pi\cdot(t_{upd}/T_{c\_grd})=2\pi\cdot t_{upd}\cdot f_{grd} \quad (\text{Eq. 5})$$

where $f_{grd}$ is the frequency of the grid voltage; $T_{c\_grd}$ is the cycle time of the grid voltage; and $t_{upd}$ is the updating period for the calculation of phase angles $\theta_k$ and $\gamma_k$. During normal operating conditions, the value of the increment angle Δθ is "updated" every cycle time $T_{c\_grd}$ with the frequency $f_{grd}$. However, if an abnormal operation is sensed or occurs, the increment angle Δθ of block 30 is not sent to block 38. Rather, the increment angle Δθ used within block 30 remains equal to its previous value and is not updated.

In block or portion 32, a detector is used to sense or detect abnormal operation within the grid frequency. When an abnormal grid frequency (as defined below) is sensed or detected, the output ER2 of block 32 changes its logic level from "0" to "1", effective to open the conventional switch or switching device 36 ("SW2"). When such a switch is made, the increment angle Δθ calculated in block 30 is not sent to block 38. The following algorithms are used within block 32 in order to detect the abnormal operation of the grid frequency;

if $f_{grd\_L} < f_{grd} < f_{grd\_H}$, ER2=0;
else ER2=1,
where the values $f_{grd\_L}$ and $f_{grd\_H}$ are pre-determined low and high limits of the grid frequency $f_{grd}$ in the normal operation range.

Functional block, portion or step 24 is communicatively connected to portion 22 and generates an "initial" angle $\theta_0$ that is used as an input for block 38. With $\gamma_k$ representing the angle $\gamma$ at time step k, $\gamma_{k-1}$ representing the angle $\gamma$ at time step k-1, and sign[$\gamma$] representing the sign change of $\gamma$ from positive to negative, $\theta_0$ is generated by use of the following algorithms:

if $\gamma_k$ changes its sign from positive to negative at time step k, i.e., if $\gamma_{k-1} > 0$, $\gamma_k < 0$, $$\text{sign}[\gamma]=1 \tag{Eq. 6}$$

$$\text{and, at this time } \theta_0 = \gamma_k \tag{Eq. 7}$$

Figure 4:
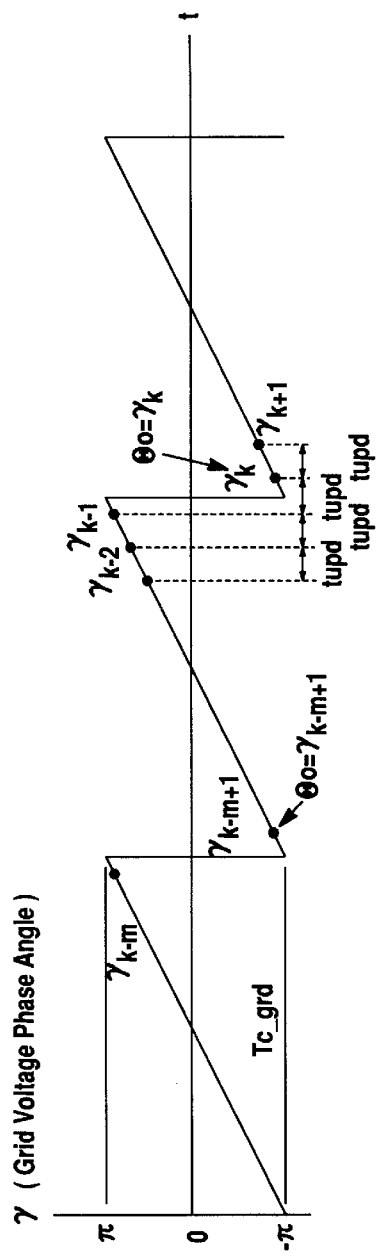
FIG. 4 is a graph illustrating the principles used to generate the voltage phase angle $\theta_0$ at the initiation of each cycle.

FIG. 4 illustrates the principle of the above-delineated algorithms. In normal operating conditions, the initial angle $\theta_0$ is updated every cycle time $T_{c\_grd}$ with the frequency $f_{grd}$. When abnormal operation occurs, a value "0" is sent to block 38 instead of the angle $\theta_0$.

Block or portion 26 is effective to detect the abnormal operation of the grid voltage phase angle $\gamma$. When an abnormal angle change is detected, block 26 changes its output ER1 from a logic level "0" to a logic level "1", thereby opening the switch or switching device 34 ("SW1"). When switch 34 is in an "open" position or state, the angle "0" is sent to block 38 (i.e., $\theta_0$ is set equal to zero, which means there is no updating of $\theta_0$). Block 26 uses the following algorithms to detect the abnormal operation of the grid phase angle:

$$\Delta\gamma = \gamma_k - \gamma_{k-1} \tag{Eq. 8}$$

if $\Delta\gamma\_L < \Delta\gamma < \Delta\gamma\_H$, ER1=0;
else ER1=1.
where $\Delta\gamma\_L$ and $\Delta\gamma\_H$ are pre-determined low and high limits of the grid angle change step value $\Delta\gamma$ in the normal operation.

Functional block, portion or step 38 represents a voltage phase angle generator and is selectively and communicatively connected to portions 24 and 30. The APS phase angle $\theta_k$ generated by block 38 is synchronized with the voltage phase angle $\gamma$ of the grid 14 with which the APS 12 operates in parallel. Block 38 receives the "initial" angle $\theta_0$ from block 24 and the angle increment $\Delta\theta$ from block 30. The following equations are used for phase angle generation in block 38:

$$\theta_k = \theta_{k-1} + \Delta\theta \tag{Eq. 9}$$

$$\text{when sign}[\gamma]=0, \text{ and } \theta_k = \theta_0 \tag{Eq. 10}$$

when sign[$\gamma$]=1
where $$-\pi \leq \theta_k \leq \pi$$

In Eqs. 9 and 10, $\theta_k$ is the phase angle of the output voltage of the APS 12 at a certain time step "k". Because alternating current type voltage has a sinusoidal waveform characteristic, angle $\theta_k$ has $2\pi$ as its cycle and repeats its values within $-\pi$ to $+\pi$ in the algorithm. Also, in Eqs. 9 and 10, $\theta_{k-1}$ is the previously calculated phase angle at time step k-1; $\theta_0$ is the angle at the initiation in each cycle ($-\pi$ to $+\pi$) which is generated in functional block or step 24 and which is used for phase angle synchronization; and $\Delta\theta$ is the angle increment in the time step $t_{upd}$ that is generated in functional block or step 30.

As should be appreciated by one of ordinary skill in the art, system 10 and method 20 ensure synchronization between the APS 12 and the grid 14 in normal operation. Particularly, since the angle $\theta_0$ is equal to the actual grid voltage phase angle $\gamma$ at the initiation in every cycle, synchronization is guaranteed during normal operation. Furthermore, system 10 and method 20 ensure that the voltage phase angle is generated for the APS 12 even during abnormal operation. Moreover, the generated voltage phase angle for the APS is less sensitive to noise on the grid voltage than the angle generated by using a PLL, since $\theta_k$ is updated by a constant increment $\Delta\theta$ in every cycle and only at the initiation of each cycle, a measured phase angle $\theta_0$ of the actual grid voltage is used.

Figure 5:
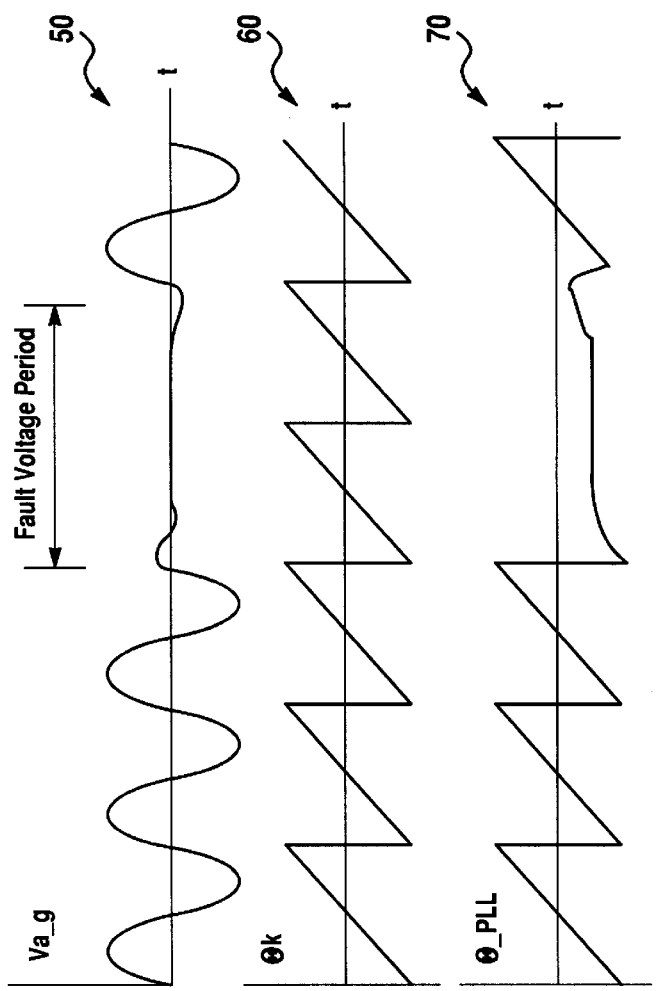
FIG. 5 is a series of graphs illustrating the voltage phase angle generated by use of the present invention and by use of the prior art phase lock loop ("PLL") method during a fault condition.

Referring now to FIG. 5, there is shown an example of the voltage phase angle generation of the proposed new method before and after a grid voltage fault compared to the phase angle generation of a PLL system. Particularly, graph 50 of FIG. 5 illustrates grid voltage Va_g over a period of time including a fault voltage period. Graphs 60 and 70 respectively illustrate the APS phase angle $\theta_k$ generated by the present system 10 and the APS phase angle $\theta\__{PLL}$ generated by a phase lock loop type system over the same period of time. As illustrated by graph 60, the present system provides a synchronized phase angle $\theta_k$ before, during and after a fault or abnormal operating condition.

It should be understood that the inventions described herein are provided by way of example only and that numerous changes, alterations, modifications, and substitutions may be made without departing from the spirit and scope of the inventions as delineated within the following claims.

What is claimed is:

1. A system for synchronizing a first phase angle of a power source with a second phase angle of a power grid, said system comprising:

a first portion which receives a grid voltage from said power grid and which uses said grid voltage to calculate said second phase angle;

a second portion which is communicatively connected to said first portion, which receives said calculated second phase angle, and which uses said second phase angle to calculate a grid voltage frequency;

a third portion which is communicatively connected to said second portion, which receives said calculated grid voltage frequency, and which uses said grid voltage frequency to generate an increment angle;

a fourth portion which is communicatively connected to said first portion, which receives said second phase angle, and which generates an initial angle based upon said second phase angle; and a fifth portion which is communicatively connected to said third and fourth portions, which selectively receives said increment angle and said initial angle, and which uses said received increment and initial angles to generate said first phase angle having a value that is substantially identical to said second phase angle.

2. The system of claim 1 wherein said fifth portion causes said generated first phase angle to be equal to said initial angle when said second phase angle has changed from a positive value to a negative value, or otherwise equal to the sum of said increment angle and a previously calculated first phase angle.

3. The system of claim 1 further comprising a grid voltage frequency fault detector which receives said generated grid voltage frequency and which causes said increment angle to be communicated to said fifth portion only if said grid voltage frequency falls within a predetermined range of values.

4. The system of claim 3 wherein said third portion is selectively connected to said fifth portion by use of a switch which is selectively controlled by said grid voltage frequency fault detector.

5. The system of claim 4 further comprising a grid angle fault detector which receives said second phase angle and calculates a grid angle change step value based upon said second phase angle, and which causes said generated initial angle to be communicated to said fifth portion only if said grid angle change step value falls within a predetermined range of values.

6. The system of claim 5 wherein said fourth portion is selectively connected to said fifth portion by use of a switch which is selectively controlled by said grid angle fault detector.

7. The system of claim 6 wherein said power source and said power grid each operate by use of a three-phase alternating current.

8. A method for synchronizing a first phase angle of a power source with a second phase angle of a power grid, said method comprising the steps of:

measuring a grid voltage from said power grid;

calculating said second phase angle by use of said measured grid voltage;

calculating a grid voltage frequency by use of said second phase angle;

generating an increment angle by use of said grid voltage frequency;

generating an initial angle based upon said second phase angle; and using said increment and initial angles to generate said first phase angle having a value that is substantially identical to said second phase angle.

9. The method of claim 8 further comprising the steps of:

determining whether said second phase angle has changed from a positive value to a negative value; and causing said generated first phase angle to be equal to said initial angle when said second phase angle has changed from a positive value to a negative value, or otherwise to be equal to the sum of said increment angle and a previously calculated first phase angle.

10. The method of claim 9 wherein said power grid has a cycle time, said method further comprising the steps of:

updating said initial angle and said increment angle every cycle time.

11. The method of claim 10 further comprising the steps of:

monitoring said grid voltage to detect abnormal operation in the frequency of said grid voltage; and updating said increment angle only if abnormal operation in the frequency of said grid voltage has not been detected.

12. The method of claim 11 wherein said power source is a three-phase alternating current power source.

13. A method for synchronizing a first phase angle of a power source and a second phase angle of a power grid, said method comprising the steps of:

monitoring a voltage signal from said power grid;

calculating said second phase angle by use of said voltage signal;

determining when said voltage signal changes from a positive value to a negative value; and causing said first phase angle to equal said calculated second phase angle when said voltage signal changes from a positive value to a negative value, or otherwise, causing said first phase angle to equal a previous value of said second phase angle plus an increment angle.

14. The method of claim 13 further comprising the steps of:

determining a grid voltage frequency; and using said grid voltage frequency to determine said increment angle.

15. The method of claim 14 wherein said grid has an associated cycle time and further comprising the step of:

updating said increment angle every cycle time; and using said updated increment angle to calculate said first phase angle.

16. The method of claim 15 further comprising the steps of:

monitoring said voltage signal to detect abnormal operation in the frequency of said voltage signal; and using said updated increment angle to calculate said first phase angle only if abnormal operation in the frequency of the voltage signal has not been detected.

17. The method of claim 16 wherein said power source comprises a three-phase alternating current power source.

18. The method of claim 17 further comprising the step of:

providing a circuit breaker; and selectively coupling said power source to said power grid by use of said circuit breaker.

* * * * *